US012682521B2

(12) United States Patent
Kim et al.

(10) Patent No.: US 12,682,521 B2
(45) Date of Patent: Jul. 14, 2026

(54) VISUAL CRYPTOGRAPHY FOR TEXT USING LAYERS

(71) Applicant: Blinkly, Inc., Washington, DC (US)

(72) Inventors: Joowon Kim, Washington, DC (US); Reechik Chatterjee, Washington, DC (US)

(73) Assignee: Blinkly, Inc., Washington, DC (US)

( * ) Notice: Subject to any disclaimer, the term of this patent is extended or adjusted under 35 U.S.C. 154(b) by 120 days.

(21) Appl. No.: 18/399,009

(22) Filed: Dec. 28, 2023

(65) Prior Publication Data

US 2025/0218075 A1 Jul. 3, 2025

(51) Int. Cl.
*G06T 11/60* (2026.01)
*G06T 5/70* (2024.01)

(52) U.S. Cl.
CPC ............... *G06T 11/60* (2013.01); *G06T 5/70* (2024.01)

(58) Field of Classification Search
CPC .......... G06T 11/60; G06T 5/70; G06T 1/0021
See application file for complete search history.

(56) References Cited

U.S. PATENT DOCUMENTS

2009/0268904 A1* 10/2009 Verhulst ................... G09C 5/00
380/54
2015/0302600 A1* 10/2015 Kreder, III ............. H04N 5/913
382/283

2015/0371014 A1* 12/2015 Raley .................... G09G 5/395
726/26
2017/0070342 A1* 3/2017 Janus .................... H04L 9/0637
2022/0019828 A1* 1/2022 Amthor ................. G06N 3/047
2024/0330895 A1* 10/2024 Jayaraman ......... G06Q 20/3827

OTHER PUBLICATIONS

Raynal et al., "Image Obfuscation for Privacy-Preserving Machine Learning", Computer Science, Cryptography and Security, 18 pgs, Oct. 2020.
Zhang et al., "Mixup: Beyond Empirical Risk Minimization", Computer Science, Machine Learning, 13 pgs, Apr. 2018.

* cited by examiner

*Primary Examiner* — Phi Hoang
(74) *Attorney, Agent, or Firm* — Potomac Law Group, PLLC

(57) ABSTRACT

Implementations provide visual cryptographic techniques that obscure text using pixel manipulation and multiple visual layers. The visual cryptography techniques implemented in embodiments manipulate the pixel values of an image that define target text and generate multiple layers using the manipulated pixel values. The generated layers are configured such that successive and rapid display of the layers generates an obscured version of the image and a legible version of the target text when viewed by a person. However, implementations generate and/or display the layers such that the target text is illegible in captured image(s) or video of the obscured version of the image. Thus, embodiments provide an obscured version of an image with legible target text when viewed by a person, but the target text is illegible in captured image(s) or video of the obscured version of the image due to insufficient information capture.

20 Claims, 8 Drawing Sheets

600

Great power competition is the central challenge to U.S. prosperity and security. A rapidly growing China and resurgent Russia aim to coerce their regional neighbors, undermine long-standing alliances, and displace American influence from critical regions around the globe.

602

604

606

608

610

500
506
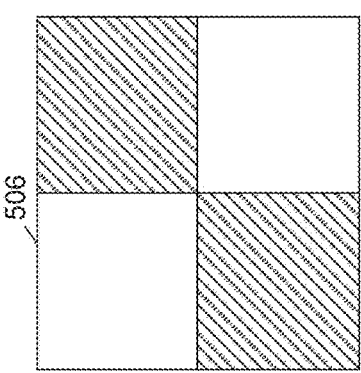
504
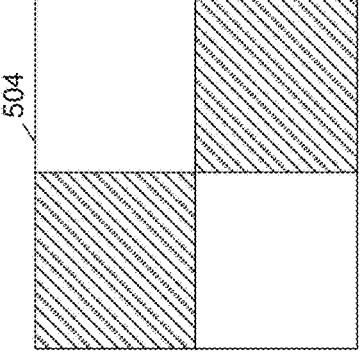
502
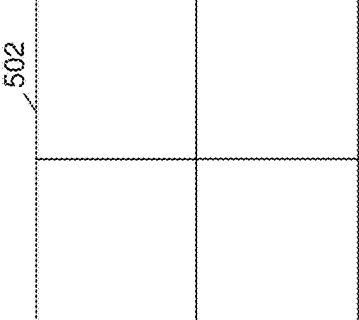
Fig. 5

Figure 6:
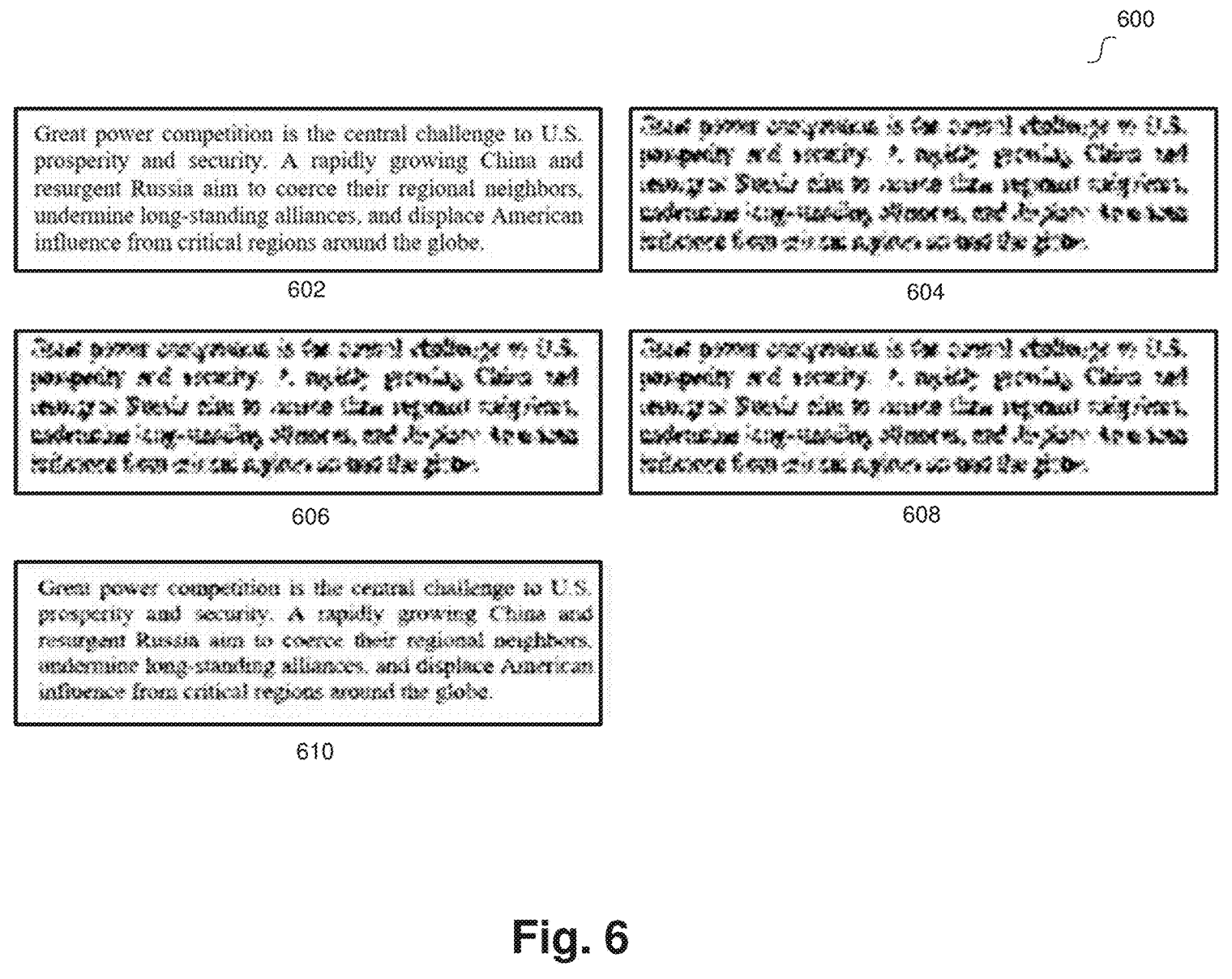

600

602

Great power competition is the central challenge to U.S. prosperity and security. A rapidly growing China and resurgent Russia aim to coerce their regional neighbors, undermine long-standing alliances, and displace American influence from critical regions around the globe.

610

Great power competition is the central challenge to U.S. prosperity and security. A rapidly growing China and resurgent Russia aim to coerce their regional neighbors, undermine long-standing alliances, and displace American influence from critical regions around the globe.

RECEIVING AN IMAGE COMPRISING TEXT — 702

MANIPULATING THE PIXEL VALUES OF THE IMAGE — 704

GENERATING SEMI-TRANSPARENT VISUAL LAYERS USING THE MANIPULATED PIXEL VALUES — 706

PROVIDING THE SEMI-TRANSPARENT VISUAL LAYERS TO AN OUTPUT ELEMENT THAT RENDERS AND/OR DISPLAYS THE LAYERS — 708

VISUAL CRYPTOGRAPHY FOR TEXT USING LAYERS

FIELD

The embodiments of the present disclosure generally relate to obscuring an image of text using visual cryptography.

BACKGROUND

Data privacy has become increasingly important, and this trend is expected to accelerate. Conventional encryption technologies can support data privacy solutions, however the data encryption used is not comprehensible to humans. These conventional encryption technologies are often relied upon to maintain data security as data traverses a network or in order to maintain the encryption when an end-user does not comprise the appropriate decryption credential(s). In order to provide a human comprehensible version of information, the data is decrypted and loses its data privacy protections. Some visual cryptography solutions support comprehensible data while maintaining levels of data privacy. However, visual cryptography technology is often limited by hardware requirements or impractical user workflows.

SUMMARY

The embodiments of the present disclosure generally relate to obscuring an image of text using visual cryptography. An image comprising pixel values that define target text can be received. A plurality of visual layers can be generated using the received image. The visual layers can be generated by manipulating the pixel values of the image. Each of the visual layers can comprise one or more blank portions and one or more populated portions, the populated portions comprising at least some of the manipulated pixel values. The visual layers can be provided to a visual output element. The visual output element can successively render different ones or combinations of the visual layers over a period of time. The successively rendered visual layers can be displayed via display hardware as an obscured representation of the image, and The obscured representation of the image displayed by the display hardware can comprise a version of the target text that is legible to a person.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 5 illustrates a conceptual diagram of a simplified pattern for layers according to example embodiment(s).

FIG. 6 illustrates visual representations of text according to example embodiment(s).

DETAILED DESCRIPTION

Figure 1:
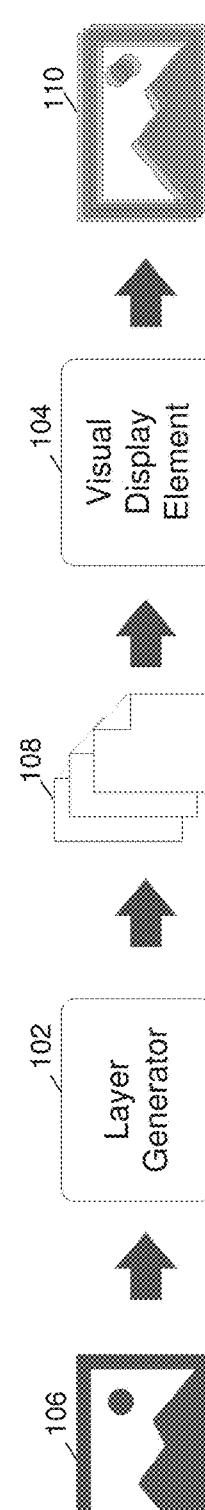
FIG. 1 illustrates a system for obscuring an image of text using visual cryptography according to example embodiment(s).

Implementations provide visual cryptographic techniques that obscure text using pixel manipulation and multiple visual layers. Visual cryptography refers to cryptographic techniques for visual information (e.g., images, text, etc.). For example, a simplified visual cryptography technique may split an image into two chunks, where neither chunk by itself includes enough information to represent the whole image. These two chunks can then be layered (e.g., one on top of the other) to generate a visual representation of the image. The visual cryptography techniques implemented in embodiments manipulate the pixel values of an image that define target text and generate multiple layers using the manipulated pixel values. The layers are configured such that successive and rapid display of the layers generates an obscured version of the image and a legible version of the target text when viewed by a person. However, implementations generate and/or display the layers such that the target text is illegible in captured image(s) or video of the obscured version of the image. For example, the captured image(s) or video may only capture one or a subset of the successive and rapidly displayed layers, and this one or subset of layers does/do not contain enough information to construct a legible visual representation of the target text.

Thus, embodiments provide an obscured version of an image with legible target text when viewed by a person, but the target text is illegible in captured image(s) or video of the obscured version of the image due to insufficient information capture. In some implementations, a visual cryptography manager can receive the image comprising the target text and generate the multiple layers. For example, the visual cryptography manager can manipulate the pixel values of the received image and generate the layers using the manipulated pixel values. The layers can each include a blank portion, or portion with little or no visual information with respect to the received image or target text, and a populated portion, or portion that comprises the manipulated pixel values. The visual cryptography manager can generate the layers according to a pattern (or multiple patterns) such that blank portion(s) of the layers overlap with populated portion(s) of others of the layers. Due to this relationship among the generated layers, rapid and successive display of the layers can generate a legible visual representation of the target text when viewed by a human.

In an example implementation, the visual cryptography manager can generate up to 60 layers, such as when targeting a 60 Hz display monitor, and the 60 layers can each be displayed over approximately one second of time to create the legible visual representation of the target text. Any other suitable number of layers, time period, and/or layer display rate can be implemented. For example, 10, 20 30, 60, 90, 120, or any other suitable number of layers can be generated. The layers can be displayed over a fraction of a second (e.g., 0.2 seconds, 0.5 seconds, 0.8 seconds, etc.), one second, multiples seconds, and the like. Any given combination of number of layers and layer display rate can be displayed via monitor with any suitable display/refresh rate (e.g., 60 Hz, 75 Hz, 90 Hz, 100 Hz, 120 Hz, 144, 240 Hz, etc.).

The display changes caused by the rapid and successive display of the layers leaves missing visual information at any given instant over the time period. This missing information provides data privacy benefits, as captured image(s) or video will not capture enough information to construct legible text. When viewed by human eye(s), the missing information is remedied by the human brain's ability to "fill-in" missing information, a phenomenon known as "visual closure". For example, the visual cryptography manager generates visual layers such that their pattern and number provide a human (e.g., human eyes and a human brain) enough information to "fill-in" the missing information when the layers are successively and rapidly displayed.

In some implementations, the visual cryptography manager's manipulation of the received image/target text pixel values, which is used to generate the visual layers, achieves an information balance. For example, the information balance leaves sufficient information out when the successively displayed layers are captured in image(s) or video (e.g., to ensure the captured image(s)/video cannot construct legible target text), yet provides enough information so that a human brain can "fill-in" the missing information to perceive legible target text when a human looks at the successively displayed layers. Example pixel manipulation techniques include structure pixel manipulation, distortion pixel manipulation, other suitable pixel manipulation techniques, or any combination thereof.

In some implementations, structure pixel manipulation can include applying pixel value(s) from adjacent/other image pixels to augment one or more target image pixel values. For example, the pixel value(s) from adjacent/other pixels can be combined with the target pixel value(s), averaged along with the target pixel value(s), used to replace all or a portion of the target pixel value(s), and the like. In some implementations, distortion pixel manipulation can include augmenting target pixel(s) with noise, applying blur to target pixel(s) (e.g., via Gaussian blur filter(s)), filtering noise and/or blur from target pixel(s), pixelating target pixel(s), applying any other suitable filter to target pixel(s), and the like.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for obscuring an image of text using visual cryptography according to example embodiment(s). System 100 includes layer generator 102 and visual display element 104. For example, layer generator 102 can receive image 106 and generate layers 108 using the image. Visual display element 104 can receive layers 108 and render output 110, or a successively rendered ones or combinations of layers 108. In some implementations, image 106 is an image of text, layers 108 comprise partial components of information that represent the text from image 106, and output 110 represents a legible visual representation of that text from image 106 when output 110 is displayed to a human. In addition, layers 108 and output 110 can be configured to provide visual encryption of the text from image 106 that is resistant to image capture.

For example, an image capturing device (e.g., camera) can capture image(s) or video of displayed output 110, however the captured image(s)/video will not comprise a legible visual representation of the text from image 106 in some embodiments. Layer generator 102 and visual display element 104 can construct layers 108 and output 110 such that the captured image(s)/video only capture one or a small subset of layers 108. The one or small subset of captured layers 108 do not contain enough information to support a legible visual representation of the text from image 106. Accordingly, embodiments provide visual encryption for text that is legible to a human but resistant to image capture.

Layer generator 102 and visual display element 104 can be implemented at any one or more computing devices, such as a client computing device (e.g., laptop, smartphone, smart home device, tablet, etc.), cloud computing device (e.g., server, edge device, etc.), network computing device, any other suitable computing device, or any combination thereof. For example, image 106 can be provided to visual encryption computing device(s) (that implement layer generator 102 and visual display element 104) from a source computing device (e.g., over a network). In some embodiments, the provided image 106 can be encrypted and the visual encryption computing device(s) can decrypt the image to generate output 110.

In some implementations, the visual encryption computing device(s) can be located on a network between source computing device(s) that provide image 106 and target computing device(s) that receive output 110. For example, the visual encryption computing device(s) can be part of a secure information sharing service (e.g., email service, document/information sharing service, shared cloud storage service, etc.) that provides visual encryption for information shared between the source computing device(s) and the target computing device(s).

Figure 2:
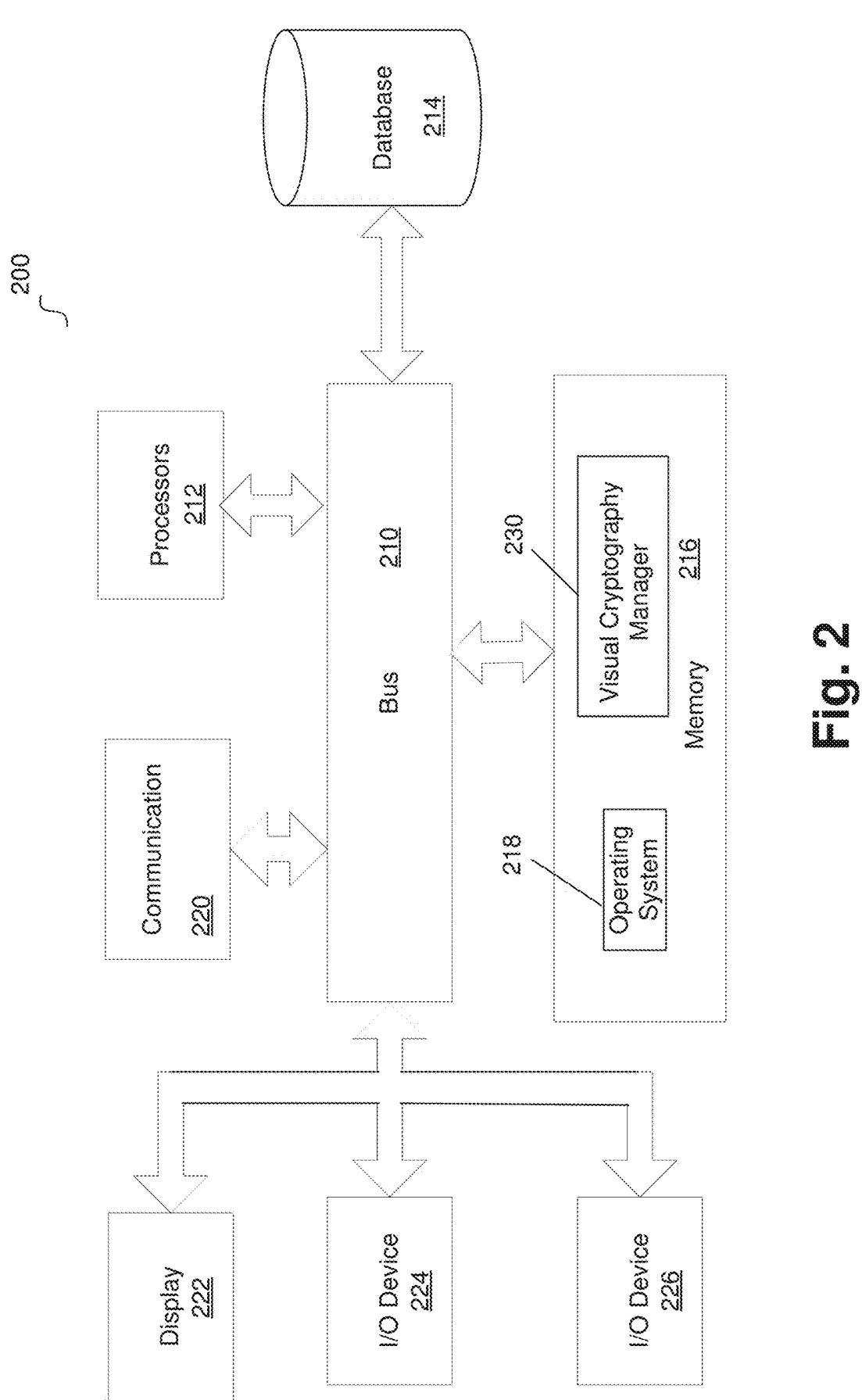
FIG. 2 illustrates a diagram of a computing system according to example embodiment(s).

FIG. 2 is a diagram of a computing system 200 in accordance with embodiments. As shown in FIG. 2, system 200 may include a bus 210, as well as other elements, configured to communicate information among processor 212, data 214, memory 216, and/or other components of system 200. Processor 212 may include one or more general or specific purpose processors configured to execute commands, perform computation, and/or control functions of system 200. Processor 212 may include a single integrated circuit, such as a micro-processing device, or may include multiple integrated circuit devices and/or circuit boards working in combination. Processor 212 may execute software, such as operating system 218, visual cryptography manager 230, and/or other applications stored at memory 216.

Communication component 220 may enable connectivity between the components of system 200 and other devices, such as by processing (e.g., encoding) data to be sent from one or more components of system 200 to another device over a network (not shown) and processing (e.g., decoding) data received from another system over the network for one or more components of system 200. For example, communication component 220 may include a network interface card that is configured to provide wireless network communications. Any suitable wireless communication protocols or techniques may be implemented by communication component 220, such as Wi-Fi, Bluetooth®, Zigbee, radio, infrared, and/or cellular communication technologies and protocols. In some embodiments, communication component 220 may provide wired network connections, techniques, and protocols, such as an Ethernet.

System 200 includes memory 216, which can store information and instructions for processor 212. Embodiments of memory 216 contain components for retrieving, reading, writing, modifying, and storing data. Memory 216 may store software that performs functions when executed by processor 212. For example, operating system 218 (and processor 212) can provide operating system functionality for system 200. Visual cryptography manager 230 (and processor 212) can provide synchronization of a source database and a reflection database based on data flows. Embodiments of visual cryptography manager 230 may be implemented as an in-memory configuration. Software modules of memory 216 can include operating system 218, visual cryptography manager 230, as well as other applications modules (not depicted).

Memory 216 includes non-transitory computer-readable media accessible by the components of system 200. For example, memory 216 may include any combination of random access memory ("RAM"), dynamic RAM ("DRAM"), static RAM ("SRAM"), read only memory ("ROM"), flash memory, cache memory, and/or any other types of non-transitory computer-readable medium. A database 214 is communicatively connected to other components of system 200 (such as via bus 212) to provide storage for the components of system 200. Embodiments of database 214 can store data in an integrated collection of logically-related records or files.

Database 214 can be a data warehouse, a distributed database, a cloud database, a secure database, an analytical database, a production database, a non-production database, an end-user database, a remote database, an in-memory database, a real-time database, a relational database, an object-oriented database, a hierarchical database, a multi-dimensional database, a Hadoop Distributed File System ("HFDS"), a NoSQL database, or any other database known in the art. Components of system 200 are further coupled (e.g., via bus 210) to: display 222 such that processor 212 can display information, data, and any other suitable display to a user, I/O device 224, such as a keyboard, and I/O device 226 such as a computer mouse or any other suitable I/O device. In some embodiments, system 200 can be an element of a system architecture, distributed system, or other suitable system. For example, system 200 can include one or more additional functional modules, open source software modules and/or libraries (e.g., pixel manipulation modules, visual information processing software, mathematics libraries, etc.), or any other suitable modules.

Embodiments of system 200 can remotely provide the relevant functionality for a separate device. In some embodiments, one or more components of system 200 may not be implemented. For example, system 200 may be a tablet, smartphone, or other wireless device that includes a display, one or more processors, and memory, but that does not include one or more other components of system 200 shown in FIG. 2. In some embodiments, implementations of system 200 can include additional components not shown in FIG. 2. While FIG. 2 depicts system 200 as a single system, the functionality of system 200 may be implemented at different locations, as a distributed system, within a cloud infrastructure, or in any other suitable manner. In some embodiments, memory 216, processor 212, and/or database 214 are be distributed (across multiple devices or computers that represent system 200). In one embodiment, system 200 may be part of a computing device (e.g., smartphone, tablet, computer, and the like).

Figure 3A:
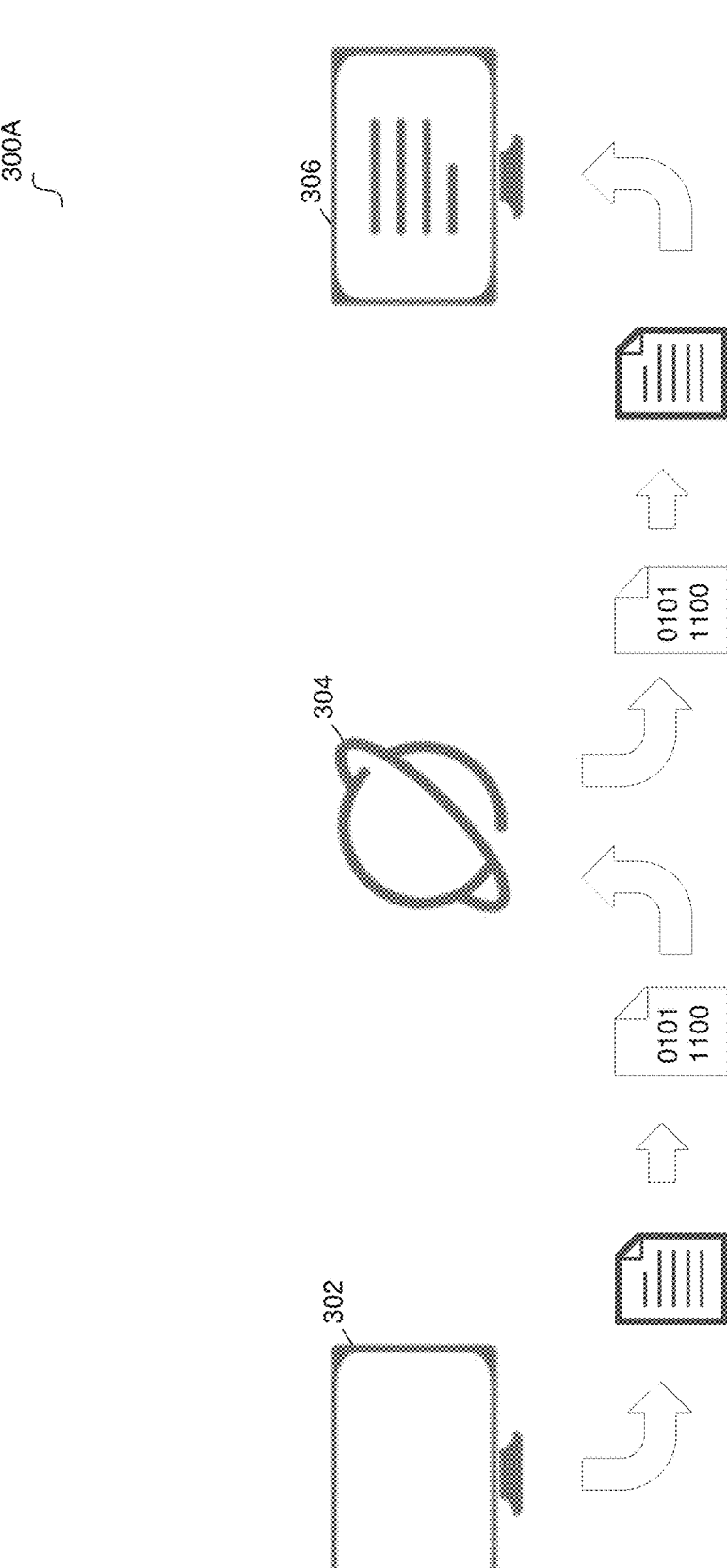
FIG. 3A is a conceptual diagram that illustrates a conventional device to device communication.

Implementations provide visual cryptography for text (e.g., alphanumeric characters, etc.) that permits sharing of text information in a manner that is resistant to image capture. Conventional information sharing systems often lack such security measures. FIG. 3A is a conceptual diagram that illustrates conventional device-to-device communication. Diagram 300A includes source system 302, cloud system 304, and target system 306. For example, source system 302 can provide information (e.g., text, a document, etc.) to cloud system 304. The information provided by source system 302 can be converted from a human-readable form (e.g., text) to a machine-readable form (e.g., encoded data, etc.). Source system 302 can in turn provide this information to target system 306. The information provided by cloud system 304 can be converted back from machine-readable form to human-readable form. For example, a user can view the provided information via a display by target system 306.

In some implementations, diagram 300A can represent an email workflow. For example, source system 302 and target system 306 can implement email client(s), and cloud system 304 can comprise an email server. These email components can implement any suitable email protocols (e.g., SMTP protocol, DNS server, authentications such as SPF, DKIM, and DMARC). In an example workflow, source system 302 (e.g., an email client at the system) can provide an email to cloud system 304 (e.g., a mail server at the system). Cloud system 304 can provide the email to target system 306 (e.g., an email client at the system), for example via a push of the email by cloud system 304 or a fetch of the email by target system 306. Target system 306 can display the received/retrieved email to a user via the email client (e.g., a web browser).

In some scenarios, source system 302, cloud system 304, and target system 306 can implement encryption techniques to secure the information (e.g., email) communicated among these components. In this example, the encrypted information can be secure while traversing a network and/or secured against decryption without the relevant credentials. However, once the encrypted information is decrypted at target system 306 for user viewing, the information may be susceptible to data privacy threats, such as visual capture. Implementations provide a visual encryption technique for text that protects against visual capture while providing a legible visual representation of text when viewing by a human.

Figure 3B:
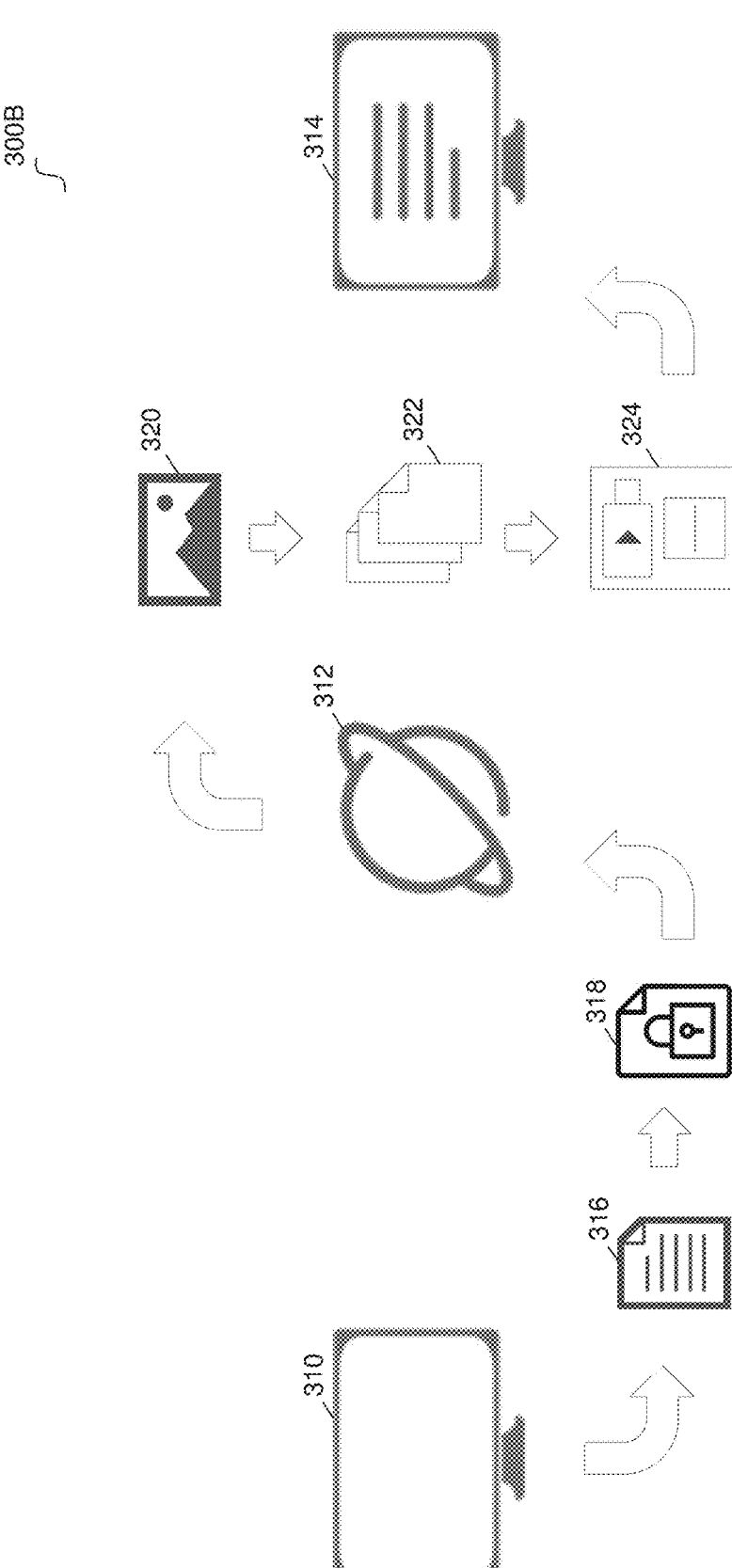
FIG. 3B is a conceptual diagram that illustrates visual cryptography techniques to obscure an image of text according to embodiment(s).

FIG. 3B is a conceptual diagram that illustrates visual cryptography techniques to obscure an image of text according to embodiment(s). Diagram 300B includes source system 310, cloud system 312, target system 314, text information 316, encrypted text image 318, decrypted text image 320, visual layers 322, and rendered output 324. For example, source system 310 can provide text information 316 (e.g., text, a document, etc.) to cloud system 312. In some implementations, a client application (e.g., browser, email client, secure application, etc.) at source system 310 can receive text information 316 as an image and/or convert text information 316 into an image. The image can be a bitmap or any other suitable format (e.g., jpeg, jpg, png, tiff, svg, and raw).

In some implementations, the client application at source system 310 can encrypt the text image to generate encrypted text image 318. Any suitable encryption technique can be utilized to encrypt the text image. Encrypted text image 318 can traverse a network (e.g., public network, the Internet, etc.) and arrive at cloud system 312. The encryption can maintain data privacy while traversing the network.

Cloud system 312 can decrypt encrypted text image 318 into decrypted text image 320. For example, that client application at source system 310 and a secure application that executes at cloud server 312 (e.g., email service, secure document storage service, secure document sharing service, etc.) can both be components of a secure information service. In some implementations, the encryption credential used to generate encrypted text image 318 can comprise a corresponding decryption credential stored/available at cloud system 312 that is used to decrypt encrypted text image 318 into decrypted text image 320.

The secure application at cloud server 312 can then generate visual layers 322 using decrypted text image 320. For example, the secure application can perform one or more pixel manipulation techniques to manipulate the pixel values of decrypted text image 320, and these manipulated pixel values can be used to construct visual layers 322, or a plurality of visual layers with blank portions and populated portions that comprise the manipulated pixel values. Visual layers 322 can be generated according to a pattern such that the blank portions and populated portions of different ones of the visual layers 322 overlap. This visual layer generation technique can generate visual layers 322 so that individual ones or subsets of the visual layers comprise deliberate information gaps. These deliberate information gaps support the data privacy benefits of the visual encryption techniques, as the individual ones or subsets of visual layers 322 cannot construct (or be used to construct) a legible visual representation of the text from decrypted text image 320.

However, this visual layer technique generation technique also supports legible display of the text from decrypted text image 320. The secure application at cloud server 312 can successively render visual layers 322 to generate rendered output 324. For example, rendered output 324 can be a video of visual layers 322 rapidly displayed in succession. In some implementations, the secure application can successively render visual layers 322 according to a sequence that corresponds to a pattern of the visual layers.

Target system 314 can receive rendered output 324 and display the rendered output using display hardware (e.g., a computer or laptop monitor, smartphone or tablet display panel, or any other suitable display hardware). For example, rendered output 324 can be a video and a client application at target system 314 can display the video. The construction and pattern of visual layers 322 generates a visual representation of decrypted text image 320 with legible text when the layers are successively rendered. For example, a human that views the display of rendered output 324 is provided a visual representation of decrypted text image 320 with legible text.

The display of rendered output 324 at target system 314 is also resistant to image capture, such as a copy and paste actions, printing (e.g., printing on paper), screen capture, screen sharing, captured image(s), and/or captured video. These image capture actions capture only a limited number of visual layers 322 due to the rapid succession render/display techniques of some embodiments. Visual layers 322 are constructed such that the limited number of visual layers contain deliberate information gaps with respect to the text of decrypted text image 320. In other words, the limited number of visual layers 322 captured via the capture actions do not contain enough information to construct a visual representation of decrypted text image 320 with legible text. Thus, implementations of the visual cryptography techniques that generate visual layers 322 and display rendered output 324 support both: a visual representation of decrypted text image 320 with legible text when viewed by a human;

and a visual representation of decrypted text image 320 that is resistant to image capture actions.

In some embodiments, diagram 300B can represent an email workflow that implements the visual cryptography techniques. For example, client application(s) at source system 310 and target system 314 can comprise email client(s), and the secure application that executes at cloud server 312 can be part of a secure email service. In some embodiments, diagram 300B can represent a secure information sharing service (e.g., cloud storage service, document sharing service, etc.) that implements the visual cryptography techniques.

In some implementations, visual layers 322 are generated using manipulated pixels from decrypted image 320. For example, different types of pixel manipulation techniques can be applied to pixel values from decrypted image 320. These manipulated pixel values are used to fill the populated portions of visual layers 320. In some implementations, the pixel manipulation and patterned construction of visual layers 320 (e.g., blank portion(s) and populated portion(s)) simultaneously achieve the deliberate information gaps associated with limited numbers of visual layers 320 and the text legible visual representation when visual layers 320 are successively rendered/displayed.

Figure 4:
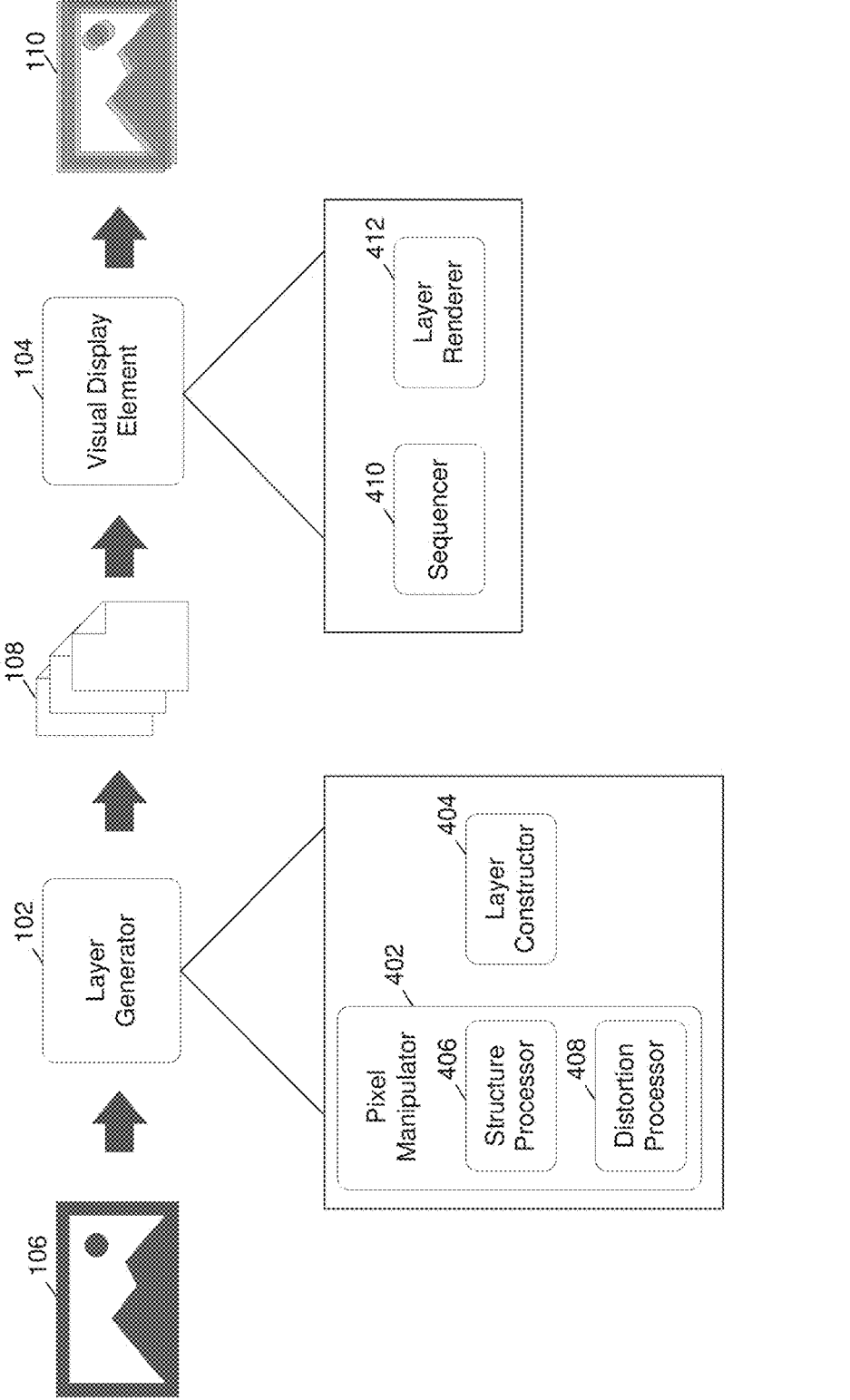
FIG. 4 illustrates system components for generating layers and rendering the layers according to example embodiment(s).

FIG. 4 illustrates system components for generating layers and rendering the layers according to example embodiment(s). System 400 includes components of system 100 of FIG. 1, including layer generator 102, visual display element 104, image 106, layers 106, and output 110, as well as components of layer generator 102, including pixel manipulator 402, layer constructor 404, structure processor 406, and distortion process 408, and components of visual display element 104, such as sequence 410 and layer renderer 412.

As disclosed with reference to FIG. 1, layer generator 108 can receive image 102 and generate layers 108 using the image. Visual display element can receive layers 108 and render output 110, or a successively rendered ones or combinations of layers 108. In some implementations, image 106 is an image of text, layers 108 comprise partial components of information that represent the text from image 106, and output 110 represents a legible visual representation of that text from image 106 when output 110 is displayed to a human. In addition, layers 108 and output 110 can be configured to provide visual encryption of the text from image 106 that is resistant to image capture and/or reproduction.

In some implementations, layer generator 102 can generate layers 108 using pixel manipulator 402, layer constructor 404, structure processor 406, and distortion process 408. For example, pixel manipulator 402 can manipulate the pixel values of image 106, such as using structure processor 406 to perform structural pixel manipulations and/or distortion processors 408 to perform distortion pixel manipulation.

In digital representation, an image is composed of pixels, or units of visual information. For example, each pixel can be represented by a combination of color values, such as red, green, and blue (RGB) in the case of a color image. The color values can be stored as numerical values, such as ranging from 0 to 255, where 0 represents the absence of color and 255 represents the maximum intensity. Pixel manipulation techniques can include manipulating numerical value(s) of the pixels that represent the image.

In some implementations, variations of structure pixel manipulation performed by structure process 406 can include applying, to one or more target pixel values from image 106, pixel value(s) from adjacent/other image pixels.

For example, the pixel value(s) from adjacent/other pixel(s) can be: combined with the target pixel value(s), averaged along with the target pixel value(s), used to replace all or a portion of the target pixel value(s), or any combination thereof. In some implementations, replacing target pixel value(s) can include shuffling pixel values in a region (e.g., exchanging pixel values among pixels of the region). In some implementations, combining adjacent/other pixel values with target pixel value(s) can include introducing the average bitmap of adjacent pixels into the target pixel value(s).

In some implementations, variations of distortion pixel manipulation can include: augmenting target pixel(s) with noise (e.g., random pixel value(s)); applying blur to target pixel(s) (e.g., via Gaussian blur filter(s)); filtering noise and/or blur from target pixel(s); pixelating target pixel(s) (e.g., enlarging target pixel(s)); applying any other suitable filter to target pixel(s), or any combination thereof. Pixel manipulation techniques can include configuration parameter(s), such as parameter(s) that define: a pixel region over which pixels values are averaged, shuffled, etc. when applying structural pixel manipulation; a degree of blur, noise, pixelation, etc. when applying distortion pixel manipulation, or any other suitable parameters.

Pixel manipulator 402 can apply one or multiple variations of structure pixel manipulation and one or more multiple variations of distortion pixel manipulation when generating layers 108. For example, a first variation of structure pixel manipulation, a second variation of structure pixel manipulation, a first variation of distortion pixel manipulation, and a second variation of distortion pixel manipulation can be applied to the pixel values of image 106 to generate manipulated pixel values for layers 108. In some implementations, different ones/subsets of layers 108 can be generated using different combinations of pixel manipulations, such as different variations of structural pixel manipulation, different variations of distortion pixel manipulation, and/or different combinations of structural pixel manipulation and/or distortion pixel manipulation. In some examples, the variation(s) in the applied pixel manipulations can result from differing configuration parameters. In some implementations, layers 108 can be generated using the same combination of pixel manipulations. Any suitable set, sequence, and/or combination of pixel manipulations can be applied to image 106 to generate layers 108.

In some implementations, after pixel manipulation(s) are applied to image 106, one or more masks can be applied to the post-manipulation output (e.g., manipulated pixel values) to generate populated portion(s) and blank portion(s) for layers 108. For example, different layers 108 can comprise different blank portions and populated portions. In some implementations, layers 108 are considered semi-transparent layers due to the blank portion(s) and populated portion(s) of each layer. However, generated layers 108 can be semi-transparent layers or any other suitable layer type. The blank portion(s) and populated portion(s) of layers 108 (e.g., layer pattern) is further discussed with reference to FIG. 5.

In some implementations, the generated layers 108 can be rendered via visual display element 104. For example, sequencer 410 can sequence the layers 108 according to a pattern that defines a relationship among the layers and layer renderer 412 can successively render layers 108 (e.g., generate a video of successively displayed layers). FIG. 5 illustrates a conceptual diagram of a simplified pattern for layers according to example embodiment(s).

Diagram 500 includes image 502, layer 504, and layer 506. Image 502 is illustrated as broken into four quadrants. Layers 504 and 506 can be generated using pixel values from image 502 such that each layer comprises blank portion(s) (e.g., portions without pixel values from the image) and populated portion(s) (e.g., portions with pixel values from the image). These layers are referred to as due to the mix of blank portions and populated portions. In a simplified example of a pattern, layers 504 and 506 can be generated such that: the blank portion(s) of layer 504 overlap with the populated portion(s) of layer 506; and the blank portion(s) of layer 506 overlap with the populated portion(s) of layer 504. This relationship between the layers is illustrated as a checkerboard pattern in diagram 500. In this simplified example, overlapping layers 504 and 506 correspond to the full set of information that represents image 500.

Implementations generate visual layers using manipulated pixel data such that the relationship between the generated visual layers is similarly based on one or more patterns with respect to the blank portion(s) of the layers and the populated portion(s) of the layers. While FIG. 5 illustrates blank portion(s) and populated portion(s) in quadrants of layers 504 and 506, implementations can generate layers with blank portion(s) and populate portion(s) across any region(s) of a layer. For example, with reference to FIG. 6, obfuscated text 604 represents one or more visual layers with blank portion(s) and populated portion(s) generated by embodiments. As illustrated, the blank portion(s) and populated portion(s) of obfuscated text 604 are spread across the layer(s). In some implementations, any suitable mask(s) (or other pixel manipulation techniques) can be used to generate, using pixel values after applying structural pixel manipulation and/or distortion pixel manipulation, layer(s) with blank portion(s) and populated portion(s) across any region of the layer(s).

In some implementations, a given region comprising populated pixel values and/or a given region comprising blank pixel values can comprise a region size. The region size across an image can be consistent or can vary. In some implementations, region size can be a function of the font size (e.g., for the text in the image), density of text within the image (e.g., smaller region for smaller text), any other suitable parameter of the image/text represented in the image, any other suitable parameter of the display hardware, and the like.

In some implementations, a given layer is generated by applying one or more mask(s) and dropping pixel values to decrease the amount of information contained in the given layer. Different layer(s) may also comprise a percentage of redundant information. For example, a subset of layers (e.g., two or more layers) may comprise overlapping populated portions.

Returning to diagram 400 of FIG. 4, layer generator 102 can generate layers 108 based on determined/retrieved display hardware characteristics. For example, visual display element 104 can generate output 110 as a rendered video. The rendered video can successively display layers 108 (e.g., overlapping and in sequence) to generate a visual representation of image 106 that is legible to a human but resistant to capture. Output 110 can be any other suitable rendering that successively displays layers 108 to generate such a visual representation.

In some implementations, output 110 can be generated for display hardware. For example, output 110 can be provided to a target client device via a secure information service (e.g., secure email service, secure document/information sharing service, etc.). In this example, layer generator 102 and visual display element 104 can execute at a cloud system, and the cloud system can provide output 110 to the target client device.

In some implementations, layer generator 102 can retrieve or receive characteristics of the display hardware of the target client device. For example, the target client device can include a hardware display (e.g., desktop monitor, laptop display screen, phone display screen, tablet display screen, etc.) that operates using a refresh rate or display frequency. Layer generator 102 can retrieve/receive the refresh rate or display frequency of the display hardware and generate layers 108 according to the rate or frequency. Example refresh rates or display frequencies include 60 Hz, 75 Hz, 90 Hz, 100 Hz, 120 Hz, 144, 240 Hz, and the like.

In some implementations, the target client device may interact with the cloud system/secure information service via a browser, and a component of the secure information service can retrieve the refresh rate or display frequency of the target client device display hardware using a JavaScript command, such as window.requestAnimationFrame). The secure information service can receive/retrieve the refresh rate or display frequency via any other suitable communication, command, or software functionality.

In some implementations, layer generator 102 can generate a number of layers 108 to correspond with this characteristic of the display hardware. For example, the number of layers 108 can: be equal to the rate/frequency; be equal to a function of the rate/frequency (e.g., 0.25×rate/frequency, 0.5×rate/frequency, 2×rate/frequency, 4×rate/frequency, etc.); or correspond to the rate/frequency in any other suitable manner. In some implementations, this correspondence can support the human legible quality of output 110. For example, when output 110 is displayed via the display hardware of the target client device at the given rate/frequency, the visual representation of image 106 can achieve the human legibility while maintaining the resistance to image capture or other reproduction actions.

In some implementations, multiple versions of output 110 can be generated, where each version is compatible with a different refresh rate or display frequency. In this example, a version for a given target client device can be selected based on the device's display hardware refresh rate or display frequency, and the selected version can be provided to the target client device.

FIG. 6 illustrates visual representations of text according to example embodiment(s). Diagram 600 includes original text 602, obfuscated text 604, screen captured text 606, camera captured text 608, and human perceived text 610. The visual representations of text illustrated in diagram 600 are representative and/or simplified examples, and corresponding real-world images may differ from these representative examples in some implementations.

Original text 602 represents an original image of text. As illustrated, this original image has clearly legible text. Obfuscated text 604 represents one or more visual layers with blank portion(s) and populated portion(s) generated by embodiment using manipulated pixel values from original text 602. As illustrated, the visual layer(s) do not contain enough information to construct legible text.

Screen captured text 606 and camera captured text 608 represent a screen grab (e.g., print screen functionality via standard computing device) and image capture (e.g., via a camera) of an obscured visual representation of original text 602 generated by embodiments, respectively. For example, the obscured visual representation of original text 602 can be implemented by successively displaying the visual layers generated based on original image 602 (e.g., using manipulated pixel values from images 602). Screen captured text 606 can represent a screen grab while a computing device (e.g., laptop, tablet, desktop comprising a monitor, etc.) displays this obscured visual representation of original image 602 and camera captured text 608 can represent an image/photograph taken by a camera of the obscured visual representation. As illustrated, screen captured text 606 and camera captured text 608 do not contain enough information to construct legible text. This is at least because only one or a subset of the visual layers are captured by the screen captured action or image capture action.

Human perceived text 610 represents what a human sees when viewing the obscured visual representation of original text 602 generated by embodiments. For example, when viewing the successively displayed visual layers a human's eye(s) and brain can "fill-in" information gaps left by the successive display using a human-centric phenomenon known as "visual closure." Accordingly, implementations of the visual cryptography techniques achieve a visual representation of text that is legible when viewed by a human but resistant to capture actions (e.g., camera capture, screen grabs, etc.).

Implementations can achieve resistance to capture actions, such as camera capture, screen grabs, etc.) at a given success rate. For example, a capture action that captures layer(s) such that the text represented by the captured layer(s) is illegible can represent a success instance and a capture action that captures layer(s) such that the text represented by the captured layer(s) is legible can represent a failure instance. Given different circumstances, such as layer generation techniques, display capabilities, visual rendering techniques, lighting, capture technique, image capturing device specifications, and the like, the success rate can vary from 60% to 100%.

Figure 7:
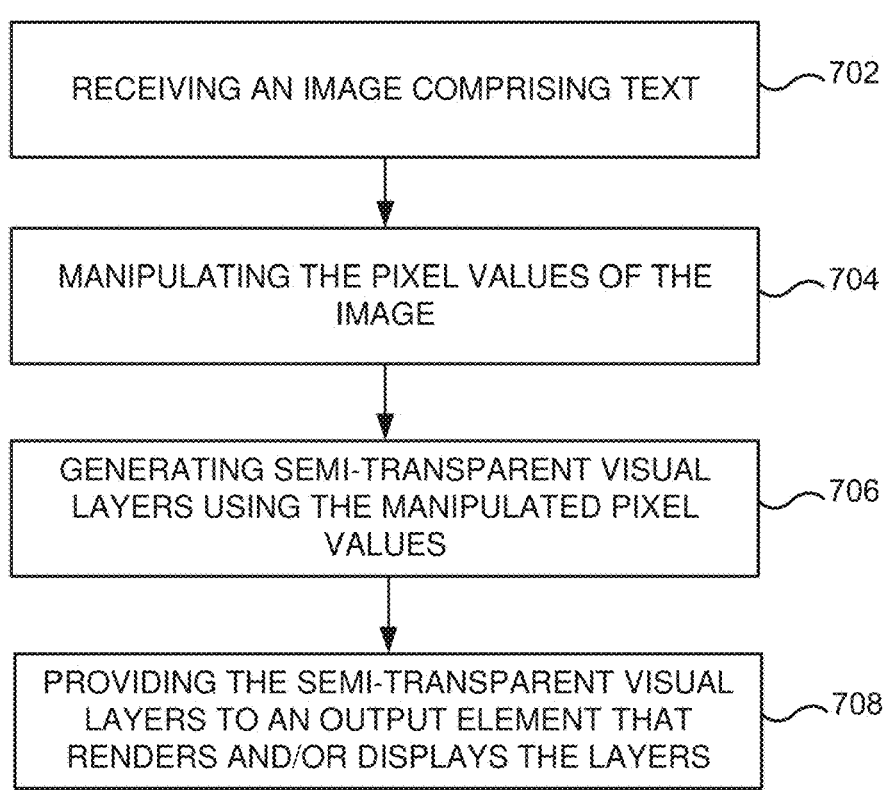
FIG. 7 illustrates a flow diagram for obscuring an image of text using visual cryptography according to an example embodiment(s).

FIG. 7 illustrates a flow diagram for obscuring an image of text using visual cryptography according to an example embodiment(s). In one embodiment, the functionality of FIG. 7 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At block 702, process 700 can receive an image comprising text. For example, an image comprising pixel values that define target text can be received. The image can be received from a client system, as part of a secure communication (e.g., email, other message, etc.), and the like. In some implementation, data comprising text (e.g., a document, etc.) can be converted into the image comprising text.

At block 704, process 700 can manipulate pixel values of the image. For example, the pixel values can be manipulated to alter structural information of the image and/or distort the image. In some implementations, manipulating the pixel values comprises replacing one or more first pixel values of the image with one or more second pixel values of the image.

In some implementations, manipulating the pixel values comprises applying structural manipulation to at least a set of the pixel values, and applying the structural manipulation comprises combining and/or averaging pixel values from two or more of the pixel values of the image to generate each pixel value in the set of pixel values. For example, variations of structure pixel manipulation can include applying, to one or more target pixel values, pixel value(s) from adjacent/ other image pixels. For example, the pixel value(s) from adjacent/other pixel(s) can be: combined with the target pixel value(s), averaged along with the target pixel value(s), used to replace all or a portion of the target pixel value(s), or any combination thereof.

In some implementations, manipulating the pixel values comprises applying distortion manipulation to at least a portion of the pixel values, the distortion manipulation comprising one or more of: a pixelation function that pixelates the portion of the pixel values; a blur function that blurs the portion of the pixel values; a noise function that applies pixel value noise to the portion of the pixel values; or any combination thereof.

At block 706, process 700 can generate visual layers using the manipulated pixel values. For example, the generated visual layers can include one or more blank portions and one or more populated portions, the populated portions comprising at least some of the manipulated pixel values. In some implementations, the visual layers can be generated according to a pattern. For example, the blank portion(s) some of the visual layers can overlap with the populated portion(s) of others of the visual layers.

At block 708, process 700 can provide the visual layers to an output element that renders the layers. For example, the output element can successively render different ones or combinations of the visual layers over a period of time. In some implementations, the successively rendered visual layers comprise a video of the obscured representation of the image. For example, a first visual layer and a second visual layer of the visual layers can be successively displayed in the video, and the first visual layer can comprise a blank portion that overlaps with a populated portion of the second visual layer.

In some implementations, the video successively displays each of the plurality of visual layers over the period of time as a display instance, and the video displays multiple of the display instances. For example, the plurality of visual layers comprise at least 30 different visual layers, 60 different visual layers, and the like.

In some implementations, the successively rendered visual layers are displayed via display hardware as an obscured representation of the image. For example, the successively rendered visual layers can be provided to a client device with display hardware that displays the successively rendered visual layers.

In some implementations, the obscured representation of the image displayed by the display hardware comprises a version of the target text that is legible to a person. In some implementations, visual capture, by an image capturing device, of the video of the obscured representation of the image is obscured such that the target text is illegible in the visual capture. For example, the visual capture, by the image capturing device, can be captured image(s) or video, the captured image(s) or video can capture one or more visual layers of the successively rendered visual layers from the displayed video, and the captured one or more visual layers can generate a captured representation of the image that comprises an illegible version of the target text.

Implementations provide visual cryptographic techniques that obscure text using pixel manipulation and multiple visual layers. The visual cryptography techniques implemented in embodiments manipulate the pixel values of an image that define target text and generate multiple layers using the manipulated pixel values. The generated layers are configured such that successive and rapid display of the layers generates an obscured version of the image and a legible version of the target text when viewed by a person. However, implementations generate and/or display the layers such that the target text is illegible in captured image(s) or video of the obscured version of the image. For example, the captured image(s) or video may only capture one or a subset of the successive and rapidly displayed layers, and this one or subset of layers does/do not contain enough information to construct a legible visual representation of the target text. Thus, embodiments provide an obscured version of an image with legible target text when viewed by a person, but the target text is illegible in captured image(s) or video of the obscured version of the image due to insufficient information capture.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure.

We claim:

1. A method for obscuring an image of text using visual cryptography, the method comprising:

receiving an image comprising pixel values that define target text;

generating a plurality of visual layers using the received image, wherein, the visual layers are generated by manipulating the pixel values of the image, and each of the visual layers comprises one or more blank portions and one or more populated portions, the populated portions comprising at least some of the manipulated pixel values; and providing the visual layers to a visual output element, wherein, the visual output element successively renders different ones or combinations of the visual layers, over a period of time, according to one or more patterns, at least one of the one or more patterns aligns an overlap, for at least a portion of the successively rendered visual layers, such that blank portions of first ones or combinations of the portion of successively rendered visual layers are aligned over populated portions of second ones or combinations of the portion of successively rendered visual layers, the successively rendered visual layers are displayed via display hardware as an obscured representation of the image that includes a legible version of the target text when perceived by a human, and at least the one or more patterns of the successively rendered visual layers secure the displayed target text against image capture, via an image capturing device.

2. The method of claim 1, wherein the one or more patterns of the successively rendered visual layers secure the displayed target text against image capture such that the target text is obscured in the visual capture.

3. The method of claim 2, wherein an instance of visual capture of the displayed target text comprises a captured image or video, the captured image or video captures one or more visual layers of the successively rendered visual layers, and the captured one or more visual layers generate a captured representation of the image that comprises an obscured version of the target text.

4. The method of claim 2, wherein the successively rendered visual layers comprise a video.

5. The method of claim 4, wherein an instance of visual capture of the displayed target text, by the image capturing device, comprises a captured image or video, the captured image or video captures one or more visual layers of the successively rendered visual layers from the displayed video, and the captured one or more visual layers generate a captured representation of the image that comprises an obscured version of the target text.

6. The method of claim 4, wherein manipulating the pixel values comprises applying structural manipulation to at least a set of the pixel values, the structural manipulation comprising combining and/or averaging pixel values from two or more of the pixel values of the image to generate each pixel value in the set of pixel values.

7. The method of claim 6, wherein manipulating the pixel values comprises applying distortion manipulation to at least a portion of the pixel values, the distortion manipulation comprising one or more of: a pixelation function that pixelates the portion of the pixel values; a blur function that blurs the portion of the pixel values; a noise function that applies pixel value noise to the portion of the pixel values; or any combination thereof.

8. The method of claim 4, wherein the first ones or combinations of the portion of successively rendered visual layers and the second ones or combinations of the portion of successively rendered visual layers are successively displayed in the video.

9. The method of claim 4, wherein the video successively displays each of the plurality of visual layers over the period of time as a display instance, and the video displays multiple of the display instance over a duration of time that spans multiple of the period of time.

10. The method of claim 9, wherein the plurality of visual layers comprise at least 30 different visual layers or at least 60 different visual layers.

11. The method of claim 1, further comprising:

determining a refresh rate for the display hardware, wherein a number of the visual layers generated and successively rendered is based on the determined refresh rate.

12. The method of claim 1, wherein different populated portions of different ones of the visual layers are redundant.

13. A non-transitory computer readable medium having instructions stored thereon that, when executed by a processor, cause the processor to obscure an image of text using visual cryptography, wherein the processor is configured to:

receive an image comprising pixel values that define target text;

generate a plurality of visual layers using the received image, wherein, the visual layers are generated by manipulating the pixel values of the image, and each of the visual layers comprises one or more blank portions and one or more populated portions, the populated portions comprising at least some of the manipulated pixel values; and provide the visual layers to a visual output element, wherein, the visual output element successively renders different ones or combinations of the visual layers, over a period of time, according to one or more patterns, at least one of the one or more patterns aligns an overlap, for at least a portion of the successively rendered visual layers, such that blank portions of first ones or combinations of the portion of successively rendered visual layers are aligned over populated portions of second ones or combinations of the portion of successively rendered visual layers, the successively rendered visual layers are displayed via display hardware as an obscured representation of the image that includes a legible version of the target text when perceived by a human, and at least the one or more patterns of the successively rendered visual layers secure the displayed target text against image capture, via an image capturing device.

14. The non-transitory computer readable medium of claim 13, wherein the one or more patterns of the successively rendered visual layer secure the displayed target text against image capture such that the target text is obscured in the visual capture.

15. The non-transitory computer readable medium of claim 14, wherein an instance of visual capture of the displayed target text comprises a captured image or video, the captured image or video captures one or more visual layers of the successively rendered visual layers, and the captured one or more visual layers generate a captured representation of the image that comprises an obscured version of the target text.

16. The non-transitory computer readable medium of claim 14, wherein the successively rendered visual layers comprise a video.

17. The non-transitory computer readable medium of claim 16, wherein an instance of visual capture of the displayed target text, by the image capturing device, comprises a captured image or video, the captured image or video captures one or more visual layers of the successively rendered visual layers from the displayed video, and the captured one or more visual layers generate a captured representation of the image that comprises an obscured version of the target text.

18. The non-transitory computer readable medium of claim 16, wherein manipulating the pixel values comprises applying structural manipulation to at least a set of the pixel values, the structural manipulation comprising combining and/or averaging pixel values from two or more of the pixel values of the image to generate each pixel value in the set of pixel values.

19. The non-transitory computer readable medium of claim 18, wherein manipulating the pixel values comprises applying distortion manipulation to at least a portion of the pixel values, the distortion manipulation comprising one or more of: a pixelation function that pixelates the portion of the pixel values; a blur function that blurs the portion of the pixel values; a noise function that applies pixel value noise to the portion of the pixel values; or any combination thereof.

20. A system for obscuring an image of text using visual cryptography, the system comprising:

a memory; and a processor, coupled to the memory, configured to:

receive an image comprising pixel values that define target text;

generate a plurality of visual layers using the received image, wherein, the visual layers are generated by manipulating the pixel values of the image, and each of the visual layers comprises one or more blank portions and one or more populated portions, the populated portions comprising at least some of the manipulated pixel values; and provide the visual layers to a visual output element, wherein, the visual output element successively renders different ones or combinations of the visual layers over a period of time, according to one or more patterns, at least one of the one or more patterns aligns an overlap, for al east a portion of the successively rendered visual layers, such that blank portions of first ones or combinations of the portion of successively rendered visual layers are aligned over populated portions of second ones or combinations of the portion of successively rendered visual layers, the successively rendered visual layers are displayed via display hardware as an obscured representation of the image that includes a legible version of the target text when perceived by a human, and at least the one or more patterns of the successively rendered visual layers secure the displayed target text against image capture, via an image capturing device.

\* \* \* \* \*